(12) United States Patent
Lietzau et al.

(10) Patent No.: US 8,653,167 B2
(45) Date of Patent: Feb. 18, 2014

(54) MOLDING COMPOSITION FOR PHOTOVOLTAIC JUNCTION BOXES AND CONNECTORS

(75) Inventors: Christian Lietzau, Delmar, NY (US); Norihiro Takamura, Tochigi (JP); Adrie Landa, Pater Dehonlaan (NL)

(73) Assignee: Sabic Innovative Plastics IP (NL)

( * ) Notice: Subject to any disclaimer, the term of this patent is extended or adjusted under 35 U.S.C. 154(b) by 205 days.

(21) Appl. No.: 13/116,363

(22) Filed: May 26, 2011

(65) Prior Publication Data

US 2012/0302679 A1  Nov. 29, 2012

(51) Int. Cl.
*C08K 5/521* (2006.01)

(52) U.S. Cl.
USPC .......................... 524/115; 524/140; 252/500

(58) Field of Classification Search
USPC ....................................................... 524/115
See application file for complete search history.

(56) References Cited

U.S. PATENT DOCUMENTS

| | | | |
|---|---|---|---|
| 2,071,250 A | 2/1937 | Carothers | |
| 2,071,251 A | 2/1937 | Carothers | |
| 2,130,523 A | 9/1938 | Carothers | |
| 2,130,948 A | 9/1938 | Carothers | |
| 2,241,322 A | 5/1941 | Hanford | |
| 2,312,966 A | 3/1943 | Hanford | |
| 2,512,606 A | 6/1950 | Bolton et al. | |
| 2,933,480 A | 4/1960 | Gresham et al. | |
| 3,093,621 A | 6/1963 | Gladding | |
| 3,211,709 A | 10/1965 | Adamek et al. | |
| 3,306,874 A | 2/1967 | Hay | |
| 3,646,168 A | 2/1972 | Barrett | |
| 3,790,519 A | 2/1974 | Wahlborg | |
| 3,884,993 A | 5/1975 | Gros | |
| 3,894,999 A | 7/1975 | Boozer et al. | |
| 4,059,654 A | 11/1977 | Von Bodungen et al. | |
| 4,309,513 A | 1/1982 | Ueno et al. | |
| 4,318,836 A | 3/1982 | Abolins | |
| 4,322,507 A | 3/1982 | Haaf | |
| 4,332,714 A | 6/1982 | Haaf et al. | |
| 4,436,854 A | 3/1984 | Brandstetter et al. | |
| 4,529,652 A | 7/1985 | Bussink et al. | |
| 4,684,681 A | 8/1987 | Lee, Jr. et al. | |
| 4,970,272 A | 11/1990 | Gallucci | |
| 5,094,806 A * | 3/1992 | Laughner | 264/523 |
| 5,206,276 A | 4/1993 | Lee, Jr. | |
| 6,025,419 A | 2/2000 | Kasowski et al. | |
| 6,344,612 B1 | 2/2002 | Kuwahara et al. | |
| 6,743,846 B2 * | 6/2004 | Landa et al. | 524/508 |
| 6,815,491 B2 | 11/2004 | Adedeji et al. | |
| 6,872,777 B2 | 3/2005 | Adedeji et al. | |
| 6,908,964 B2 | 6/2005 | Adedeji et al. | |
| 7,022,765 B2 | 4/2006 | Adedeji et al. | |
| 7,253,227 B2 * | 8/2007 | Mhetar et al. | 524/504 |
| 7,291,036 B1 | 11/2007 | Daily et al. | |
| 7,371,790 B2 | 5/2008 | Yoshida et al. | |
| 7,387,537 B1 | 6/2008 | Daily et al. | |
| 7,541,399 B2 | 6/2009 | Yoshida et al. | |
| 7,585,906 B2 | 9/2009 | Klei et al. | |
| 7,736,727 B2 | 6/2010 | Blackburn et al. | |
| 7,824,189 B1 | 11/2010 | Lauermann et al. | |
| 8,057,873 B2 | 11/2011 | Levasalmi | |
| 2003/0027459 A1 | 2/2003 | Lee | |
| 2003/0036602 A1 | 2/2003 | Adedeji et al. | |
| 2003/0125430 A1 | 7/2003 | Adedeji et al. | |
| 2004/0059042 A1 | 3/2004 | Hartle et al. | |
| 2004/0122170 A1 | 6/2004 | Mhetar et al. | |
| 2005/0080185 A1 | 4/2005 | Mhetar | |
| 2006/0020077 A1 | 1/2006 | Miyoshi et al. | |
| 2006/0058432 A1 | 3/2006 | Perego et al. | |
| 2007/0117912 A1 | 5/2007 | Balfour et al. | |
| 2007/0238190 A1 | 10/2007 | Klei et al. | |
| 2007/0238831 A1 | 10/2007 | Klei et al. | |
| 2008/0167407 A1 | 7/2008 | Kishore et al. | |
| 2008/0245270 A1 | 10/2008 | Klei et al. | |
| 2010/0068921 A1 | 3/2010 | Richter | |
| 2010/0218797 A1 | 9/2010 | Coyle, Jr. et al. | |
| 2010/0294903 A1 | 11/2010 | Shmukler et al. | |
| 2011/0003962 A1 | 1/2011 | Carrillo et al. | |
| 2011/0147076 A1 * | 6/2011 | Chen et al. | 174/520 |

FOREIGN PATENT DOCUMENTS

| | | | |
|---|---|---|---|
| EP | 0467113 A1 | 1/1992 | |
| EP | 2256167 A1 | 12/2010 | |
| EP | 2360210 A1 | 8/2011 | |
| GB | 1591137 | 6/1981 | |
| JP | 10087984 | 4/1998 | |
| WO | 9808898 | 3/1998 | |
| WO | 02057363 A2 | 7/2002 | |
| WO | 2007016296 A2 | 9/2007 | |
| WO | 2009104107 A1 | 8/2009 | |
| WO | 2012082535 A2 | 6/2012 | |

OTHER PUBLICATIONS

CN101982500 A, Mar. 2, 2011, English Abstract, 1 page.
CN102104218, Jun. 22, 2011, English Abstract, 1 pages.
CN201562817 U, Aug. 25, 2010, English Abstract, 1 page.
CN201845793 U, May 25, 2011, English Abstract, 1 page.
JP2006057107 A, Mar. 2, 2006, English Abstract, 1 page.
JP2009249515 A, Oct. 29, 2009, English Abstract, 1 page.
JP2010254994 A, Nov. 11, 2010, English Abstract, 1 page.
JP2008060389 A, Mar. 13, 2008, English Abstract, 2 pages.
ASTM D1238-10 "Standard Test Method for Melt Flow Rates of Thermoplastics by Extrusion Plastometer", ASTM International, 2010, 15 pages.

(Continued)

*Primary Examiner* — Doris Lee
(74) *Attorney, Agent, or Firm* — Cantor Colburn LLP

(57) ABSTRACT

A molding composition is disclosed which contains specific amounts of poly(arylene ether), styrenic polymer, hydrogenated block copolymer, flame retardant, and polytetrafluoroethylene. The molding composition performs well on a battery of tests, including heat resistance, impact strength, melt flow, and flame retardancy, and is particularly useful for producing photovoltaic junction boxes and connectors.

25 Claims, No Drawings

(56) References Cited

OTHER PUBLICATIONS

ASTM D256-10, "Standard Test Methods for Determining the Izod Pendulum Impact Resistance of Plastics", ASTM International, 2010, 20 pages.
CN101805509A, Abstract, Aug. 18, 2010, 1 page.
JP2008274035A, Abstract, Nov. 13, 2008, 1 page.
Mark et al (eds). Encyclolopedia of Polymer Science and Engineering, vol. 2, Anionic Polymerization to Cationic Polymerization, John Wiley & Sons, 1995, p. 324-434.
International Search Report; International Application No. PCT/US2012/037743; International Filing Date May 14, 2012; Date of Mailing Nov. 29, 2012; 6 pages.
Written Opinion of the International Searching Authority; International Application No. PCT/US2012/037743; International Filing Date May 14, 2012; Date of Mailing Nov. 28, 2012; 3 pages.
Internatonal Search Report and Written Opinion for International Application No. PCT/US2012/044897, International Filing Date Jun. 29, 2012, Date of Mailing Jan. 23, 2013, 8 pages.
JP9279044 A, Abstract, Oct. 28, 1997, 1 page.
JP2006299235 A, Nov. 2, 2006, Abstract Only, 1 page.
JP2011219531 A, Nov. 4, 2011, Abstract Only, 1 page.
International Search Report and Written Opinion; International Application No. PCT/US2012/069371; International Filing Date Dec. 13, 2012; Date of Mailing May 27, 2013; 11 pages.

* cited by examiner

MOLDING COMPOSITION FOR PHOTOVOLTAIC JUNCTION BOXES AND CONNECTORS

BACKGROUND OF THE INVENTION

Photovoltaic junction boxes are generally rectangular, low-profile plastic housings which protect electrical connections against the rigorous challenges of the outdoor environment at various points within a photovoltaic installation, from individual solar energy collection panels into power collection circuits and power management equipment for delivery to a local electrical load circuit or outgoing power transmission lines. These junction boxes may contain a varying number of wiring compartments and may be provided with wiring terminals, connectors, or leads to accommodate current-carrying conductors in a secure manner to assure that reliable reproducible connections can readily be accomplished in the field.

Photovoltaic junction boxes must therefore be manufactured to exacting tolerances to provide a durable weather-resistant housing for electrical connections that maintains its protective integrity while withstanding challenges such as impacts from objects, wind-driven rain, and exposure to extreme heat, damaging ultraviolet radiation, and fire.

Therefore, polymeric materials used for the manufacture of photovoltaic junction boxes must simultaneously meet several property requirements relating to moldability, flame retardancy, heat resistance, and ductility. In addition, the polymeric materials must have good oxidation resistance to retain useful properties for an extended period of time in outdoor use.

Some poly(arylene ether)-based resins are currently used for photovoltaic junction boxes and connectors, but there remains a desire to improve the property balance of poly(arylene ether) compositions used for injection molding of photovoltaic junction boxes. Specifically, there is a desire to improve moldability and flame retardancy without substantially detracting from other critical properties.

SUMMARY OF EMBODIMENTS OF THE INVENTION

One embodiment is a composition comprising about 65 to about 75 weight percent of a poly(arylene ether); about 3 to about 12 weight percent of a styrenic polymer selected from the group consisting of homopolystyrenes, rubber-modified impact polystyrenes, and mixtures thereof; about 10 to about 20 weight percent of a flame retardant consisting of an organophosphate ester and, optionally, an auxiliary flame retardant selected from the group consisting of nitrogen-containing flame retardants, metal hydroxides, and mixtures thereof; about 3 to about 10 weight percent of a hydrogenated block copolymer of an alkenyl aromatic compound and a conjugated diene, wherein the hydrogenated block copolymer comprises about 10 to about 45 weight percent poly(alkenyl aromatic) content, based on the weight of the hydrogenated block copolymer; and about 0.02 to about 0.25 weight percent of a polytetrafluoroethylene; wherein the composition comprises less than or equal to 5 weight percent polyamide; and wherein all weight percents are based on the total weight of the composition unless a different weight basis is specified.

Another embodiment is an injected molded article comprising a composition comprising about 65 to about 75 weight percent of a poly(arylene ether); about 3 to about 12 weight percent of a styrenic polymer selected from the group consisting of homopolystyrenes, rubber-modified impact polystyrenes, and mixtures thereof; about 10 to about 20 weight percent of a flame retardant consisting of an organophosphate ester and, optionally, an auxiliary flame retardant selected from the group consisting of nitrogen-containing flame retardants, metal hydroxides, and mixtures thereof; about 3 to about 10 weight percent of a hydrogenated block copolymer of an alkenyl aromatic compound and a conjugated diene, wherein the hydrogenated block copolymer comprises about 10 to about 45 weight percent poly(alkenyl aromatic) content, based on the weight of the hydrogenated block copolymer; and about 0.02 to about 0.25 weight percent of a polytetrafluoroethylene; wherein the composition comprises less than or equal to 5 weight percent polyamide; and wherein all weight percents are based on the total weight of the composition unless a different weight basis is specified.

These and other embodiments are described in detail below.

DETAILED DESCRIPTION OF THE INVENTION

The present inventors have discovered a poly(arylene ether) composition that produces molded articles which perform well on a battery of tests for durability, flame retardance and moldability, demonstrating its superiority for producing photovoltaic junction boxes.

One embodiment is a composition comprising about 65 to about 75 weight percent of a poly(arylene ether); about 3 to about 12 weight percent of a styrenic polymer selected from the group consisting of homopolystyrenes, rubber-modified impact polystyrenes, and mixtures thereof; about 10 to about 20 weight percent of a flame retardant consisting of an organophosphate ester and, optionally, an auxiliary flame retardant selected from the group consisting of nitrogen-containing flame retardants, metal hydroxides, and mixtures thereof; about 3 to about 10 weight percent of a hydrogenated block copolymer of an alkenyl aromatic compound and a conjugated diene, wherein the hydrogenated block copolymer comprises about 10 to about 45 weight percent poly(alkenyl aromatic) content, based on the weight of the hydrogenated block copolymer; and about 0.02 to about 0.25 weight percent of a polytetrafluoroethylene; wherein the composition comprises less than or equal to 5 weight percent polyamide; and wherein all weight percents are based on the total weight of the composition unless a different weight basis is specified.

Another embodiment is an injected molded article comprising a composition comprising about 65 to about 75 weight percent of a poly(arylene ether); about 3 to about 12 weight percent of a styrenic polymer selected from the group consisting of homopolystyrenes, rubber-modified impact polystyrenes, and mixtures thereof; about 10 to about 20 weight percent of a flame retardant consisting of an organophosphate ester and, optionally, an auxiliary flame retardant selected from the group consisting of nitrogen-containing flame retardants, metal hydroxides, and mixtures thereof; about 3 to about 10 weight percent of a hydrogenated block copolymer of an alkenyl aromatic compound and a conjugated diene, wherein the hydrogenated block copolymer comprises about 10 to about 45 weight percent poly(alkenyl aromatic) content, based on the weight of the hydrogenated block copolymer; and about 0.02 to about 0.25 weight percent of a polytetrafluoroethylene; wherein the composition comprises less than or equal to 5 weight percent polyamide; and wherein all weight percents are based on the total weight of the composition unless a different weight basis is specified.

The composition comprises a poly(arylene ether). Suitable poly(arylene ether)s include those comprising repeating structural units having the formula

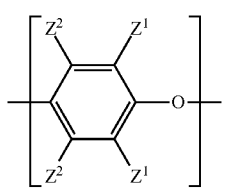

wherein each occurrence of Z' is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a terminal 3,5-dimethyl-1,4-phenyl group with the di-n-butylamine component of an oxidative polymerization catalyst.

In some embodiments, the poly(arylene ether) has an intrinsic viscosity of about 0.25 to about 1 deciliter per gram measured at 25° C. in chloroform. Within this range, the poly(arylene ether) intrinsic viscosity can be about 0.3 to about 0.65 deciliter per gram, more specifically about 0.35 to about 0.5 deciliter per gram, even more specifically about 0.4 to about 0.5 deciliter per gram.

In some embodiments, the poly(arylene ether) is characterized by a weight average molecular weight and a peak molecular weight, wherein a ratio of the weight average molecular weight to the peak molecular weight is about 1.3:1 to about 4:1. Within this range, the ratio can be about 1.5:1 to about 3:1, specifically about 1.5:1 to about 2.5:1, more specifically about 1.6:1 to about 2.3:1, still more specifically 1.7:1 to about 2.1:1. The poly(arylene ether) molecular weight distribution is typically analyzed in the molecular weight range from 250 to 1,000,000 atomic mass units. As used herein, the term "peak molecular weight" is defined as the most commonly occurring molecular weight in the molecular weight distribution. In statistical terms, the peak molecular weight is the mode of the molecular weight distribution. In practical terms, when the molecular weight is determined by a chromatographic method such as gel permeation chromatography, the peak molecular weight is the poly(arylene ether) molecular weight of the highest point in a plot of molecular weight on the x-axis versus absorbance on the y-axis. A detailed procedure for determining a molecular weight distribution using gel permeation chromatography is presented in the working examples.

In some embodiments, the poly(arylene ether) is a poly(2,6-dimethyl-1,4-phenylene ether) prepared with a morpholine-containing catalyst, wherein a purified sample of poly(2,6-dimethyl-1,4-phenylene ether) prepared by dissolution of the poly(2,6-dimethyl-1,4-phenylene ether) in toluene, precipitation from methanol, reslurry, and isolation has a monomodal molecular weight distribution in the molecular weight range of 250 to 1,000,000 atomic mass units, and comprises less than or equal to 2.2 weight percent of poly(2,6-dimethyl-1,4-phenylene ether) having a molecular weight more than fifteen times the number average molecular weight of the entire purified sample. In some embodiments, the purified sample after separation into six equal poly(2,6-dimethyl-1,4-phenylene ether) weight fractions of decreasing molecular weight comprises a first, highest molecular weight fraction comprising at least 10 mole percent of poly(2,6-dimethyl-1,4-phenylene ether) comprising a terminal morpholine-substituted phenoxy group. The poly(2,6-dimethyl-1,4-phenylene ether) according to these embodiments is further described in U.S. Patent Application Publication No. US 2011/0003962 A1 of Carrillo et al.

In some embodiments, the poly(arylene ether) is essentially free of incorporated diphenoquinone residues. In this context, "essentially free" means that the fewer than 1 weight percent of poly(arylene ether) molecules comprise the residue of a diphenoquinone. As described in U.S. Pat. No. 3,306,874 to Hay, synthesis of poly(arylene ether) by oxidative polymerization of monohydric phenol yields not only the desired poly(arylene ether) but also a diphenoquinone as side product. For example, when the monohydric phenol is 2,6-dimethylphenol, 3,3',5,5'-tetramethyldiphenoquinone is generated. Typically, the diphenoquinone is "reequilibrated" into the poly(arylene ether) (i.e., the diphenoquinone is incorporated into the poly(arylene ether) structure) by heating the polymerization reaction mixture to yield a poly(arylene ether) comprising terminal or internal diphenoquinone residues. For example, as shown in Scheme 1, when a poly(arylene ether) is prepared by oxidative polymerization of 2,6-dimethylphenol to yield poly(2,6-dimethyl-1,4-phenylene ether) and 3,3',5,5'-tetramethyldiphenoquinone, reequilibration of the reaction mixture can produce a poly(arylene ether) with terminal and internal residues of incorporated diphenoquinone.

Scheme 1

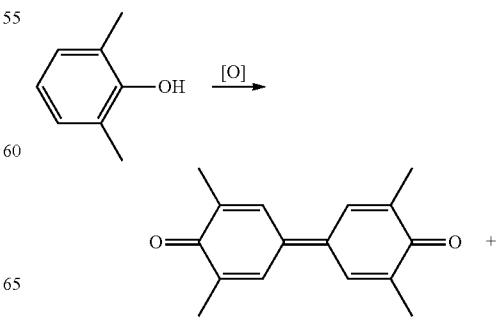

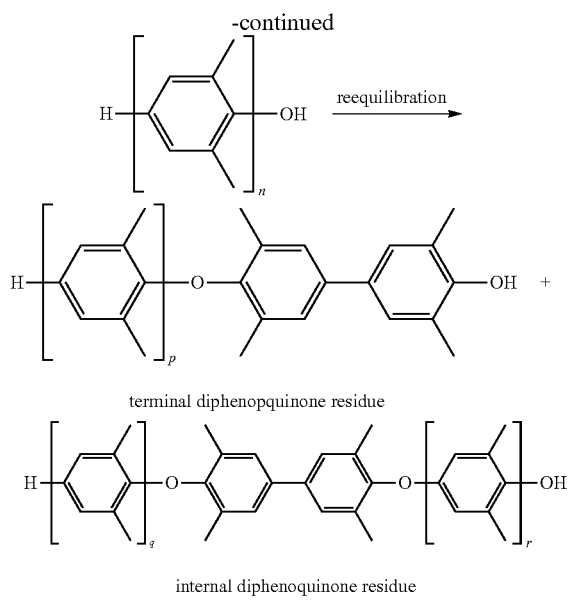

terminal diphenopquinone residue internal diphenoquinone residue

However, such reequilibration reduces the molecular weight of the poly(arylene ether) (e.g., p and q+r are each less than n). Accordingly, when a higher molecular weight poly(arylene ether) is desired, it may be desirable to separate the diphenoquinone from the poly(arylene ether) rather than reequilibrating the diphenoquinone into the poly(arylene ether) chains. Such a separation can be achieved, for example, by precipitation of the poly(arylene ether) in a solvent or solvent mixture in which the poly(arylene ether) is insoluble and the diphenoquinone is soluble. For example, when a poly(arylene ether) is prepared by oxidative polymerization of 2,6-dimethylphenol in toluene to yield a toluene solution comprising poly(2,6-dimethyl-1,4-phenylene ether) and 3,3', 5,5'-tetramethyldiphenoquinone, a poly(2,6-dimethyl-1,4-phenylene ether) essentially free of diphenoquinone can be obtained by mixing 1 volume of the toluene solution with about 1 to about 4 volumes of methanol or a methanol/water mixture. Alternatively, the amount of diphenoquinone side-product generated during oxidative polymerization can be minimized (e.g., by initiating oxidative polymerization in the presence of less than 10 weight percent of the monohydric phenol and adding at least 95 weight percent of the monohydric phenol over the course of at least 50 minutes), and/or the reequilibration of the diphenoquinone into the poly(arylene ether) chain can be minimized (e.g., by isolating the poly(arylene ether) no more than 200 minutes after termination of oxidative polymerization). These approaches are described in International Patent Application Publication No. WO2009/104107 A1 of Delsman et al. In an alternative approach utilizing the temperature-dependent solubility of diphenoquinone in toluene, a toluene solution containing diphenoquinone and poly(arylene ether) can be adjusted to a temperature of about 25° C., at which diphenoquinone is poorly soluble but the poly(arylene ether) is soluble, and the insoluble diphenoquinone can be removed by solid-liquid separation (e.g., filtration).

In some embodiments, the poly(arylene ether) comprises 2,6-dimethyl-1,4-phenylene ether units, 2,3,6-trimethyl-1,4-phenylene ether units, or a combination thereof In some embodiments, the poly(arylene ether) is a poly(2,6-dimethyl-1,4-phenylene ether). In some embodiments, the poly(arylene ether) comprises a poly(2,6-dimethyl-1,4-phenylene ether) having an intrinsic viscosity of about 0.35 to about 0.5 deciliter per gram, specifically about 0.35 to about 0.46 deciliter per gram, measured at 25° C. in chloroform.

The poly(arylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly(arylene ether) can be in the form of a homopolymer, a copolymer, a graft copolymer, an ionomer, or a block copolymer, as well as combinations thereof.

The composition comprises the poly(arylene ether) in an amount of about 65 to about 75 weight percent, based on the total weight of the composition. Within this range, the poly(arylene ether) amount can be about 67 to about 74 weight percent, more specifically about 68 to about 73 weight percent.

The composition contains from about 3 to about 12 weight percent of a styrenic polymer selected from the group consisting of homopolystyrenes, rubber-modified impact polystyrenes, and mixtures thereof Within this range, the styrenic polymer amount can be about 4 to about 10 weight percent, more specifically about 5 to about 9 weight percent, based on the total weight of the composition.

As used herein, the term homopolystyrene refers to a homopolymer of styrene. Thus, the residue of any monomer other than styrene is excluded from the homopolystyrene. The homopolystyrene can be atactic, syndiotactic, or isotactic. In some embodiments, the homopolystyrene consists of atactic homopolystyrene. In some embodiments, the homopolystyrene has a melt volume flow rate of 1.5 to 5 cubic centimeters per 10 minutes, measured at 200° C. and 5 kilogram load according to ISO 1133.

Rubber-modified polystyrene comprises polystyrene and polybutadiene. Rubber-modified polystyrenes are sometimes referred to as "high-impact polystyrenes" or "HIPS". In some embodiments, the rubber-modified polystyrene comprises 80 to 96 weight percent polystyrene, specifically 88 to 94 weight percent polystyrene; and 4 to 20 weight percent polybutadiene, specifically 6 to 12 weight percent polybutadiene, based on the weight of the rubber-modified polystyrene. In some embodiments, the rubber-modified polystyrene has an effective gel content of 10 to 35 percent. Suitable rubber-modified polystyrenes are commercially available as, for example, HIPS3190 from SABIC Innovative Plastics.

The composition contains a flame retardant consisting of an organophosphate ester and, optionally, a nitrogen-containing flame retardant. A flame retardant is a chemical compound or mixture of chemical compounds capable of improving the flame retardancy of the composition.

Exemplary organophosphate ester flame retardants include phosphate esters comprising phenyl groups, substituted phenyl groups, or a combination of phenyl groups and substituted phenyl groups, bis-aryl phosphate esters based upon resorcinol such as, for example, resorcinol bis(diphenyl phosphate), as well as those based upon bisphenols such as, for example, bisphenol A bis(diphenyl phosphate). In some embodiments, the organophosphate ester is selected from tris(alkylphenyl) phosphates (for example, CAS Reg. No. 89492-23-9 or CAS Reg. No. 78-33-1), resorcinol bis(diphenyl phosphate) (CAS Reg. No. 57583-54-7), bisphenol A bis(diphenyl phosphate) (CAS Reg. No. 181028-79-5), triphenyl phosphate (CAS Reg. No. 115-86-6), tris(isopropylphenyl) phosphates (for example, CAS Reg. No. 68937-41-7), and mixtures thereof.

In some embodiments the organophosphate ester comprises a bis-aryl phosphate having the formula

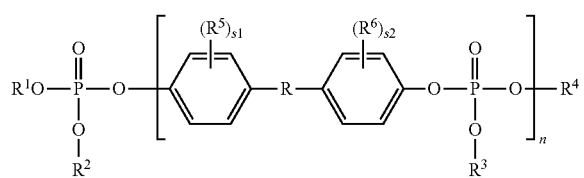

wherein R is independently at each occurrence a $C_1$-$C_{12}$ alkylene group; $R^5$ and $R^6$ are independently at each occurrence a $C_1$-$C_5$ alkyl group; $R^1$, $R^2$, and $R^4$ are independently a $C_1$-$C_{12}$ hydrocarbyl group; $R^3$ is independently at each occurrence a $C_1$-$C_{12}$ hydrocarbyl group; n is 1 to 25; and s1 and s2 are independently an integer equal to 0, 1, or 2. In some embodiments $OR^1$, $OR^2$, $OR^3$ and $OR^4$ are independently derived from phenol, a monoalkylphenol, a dialkylphenol, or a trialkylphenol. As readily appreciated by one of ordinary skill in the art, the bis-aryl phosphate is derived from a bisphenol. Exemplary bisphenols include 2,2-bis(4-hydroxyphenyl)propane (so-called bisphenol A), 2,2-bis(4-hydroxy-3-methylphenyl)propane, bis(4-hydroxyphenyl)methane, bis(4-hydroxy-3,5-dimethylphenyl)methane and 1,1-bis(4-hydroxyphenyl)ethane. In some embodiments, the bisphenol comprises bisphenol A.

In some embodiments, the flame retardant comprises a nitrogen-containing flame retardant comprising a nitrogen-containing heterocyclic base and a phosphate or pyrophosphate or polyphosphate acid. In some embodiments, the nitrogen-containing flame retardant has the formula

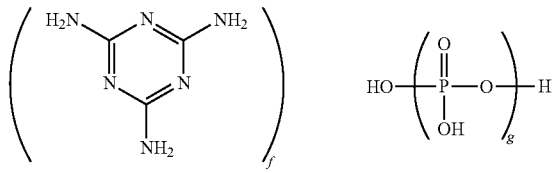

wherein g is 1 to 10,000, and the ratio of f to g is 0.5:1 to 1.7:1, specifically 0.7:1 to 1.3:1, more specifically 0.9:1 to 1.1:1. It will be understood that this formula includes species in which one or more protons are transferred from the phosphate group(s) to the melamine group(s). When g is 1, the nitrogen-containing flame retardant is melamine phosphate (CAS Reg. No. 20208-95-1). When g is 2, the nitrogen-containing flame retardant is melamine pyrophosphate (CAS Reg. No. 15541 60-3). When g is, on average, greater than 2, the nitrogen-containing flame retardant is a melamine polyphosphate (CAS Reg. No. 56386-64-2).

In some embodiments, the nitrogen-containing flame retardant is melamine pyrophosphate, melamine polyphosphate, or a mixture thereof In some embodiments in which the nitrogen-containing flame retardant is melamine polyphosphate, g has an average value of greater than 2 to 10,000, specifically 5 to 1,000, more specifically 10 to 500. In some embodiments in which the nitrogen-containing flame retardant is melamine polyphosphate, g has an average value of greater than 2 to 500. Methods for preparing melamine phosphate, melamine pyrophosphate, and melamine polyphosphate are known in the art, and all are commercially available. For example, melamine polyphosphates may be prepared by reacting polyphosphoric acid and melamine, as described, for example, in U.S. Pat. No. 6,025,419 to Kasowski et al., or by heating melamine pyrophosphate under nitrogen at 290° C. to constant weight, as described in International Patent Application No. WO 98/08898 A1 to Jacobson et al. In some embodiments, the nitrogen-containing flame retardant comprises melamine cyanurate The nitrogen-containing flame retardant can have a low volatility. For example, in some embodiments, the nitrogen-containing flame retardant exhibits less than 1 percent weight loss by thermogravimetric analysis when heated at a rate of 20° C. per minute from 25 to 280° C., specifically 25 to 300° C., more specifically 25 to 320° C.

The flame retardant is generally present in amounts of from about 10 to about 20 weight percent, specifically about 11 to about 18 weight percent, more specifically about 12 to about 16 weight percent, based on the total weight of the composition.

The composition contains a hydrogenated block copolymer of an alkenyl aromatic compound and a conjugated diene. For brevity, this component is referred to as the "hydrogenated block copolymer". The hydrogenated block copolymer generally comprises about 10 to about 45 weight percent poly(alkenyl aromatic) content, based on the weight of the hydrogenated block copolymer. Within this range, the poly (alkenyl aromatic) content can be about 20 to about 40 weight percent, specifically about 25 to about 35 weight percent.

In some embodiments, the hydrogenated block copolymer comprises a polystyrene-poly(ethylene-butylene)-polystyrene triblock copolymer having a weight average molecular weight of at least 200,000 atomic mass units. In other embodiments the polystyrene-poly(ethylene-butylene)-polystyrene triblock copolymer has a weight average molecular weight of about 200,000 to about 1,000,000 atomic mass units, more specifically. about 200,000 to about 400,000 atomic mass units.

The alkenyl aromatic monomer used to prepare the hydrogenated block copolymer can have the structure

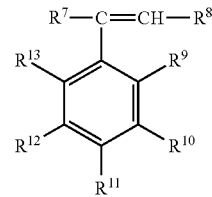

wherein $R^7$ and $R^8$ each independently represent a hydrogen atom, a $C_1$-$C_8$ alkyl group, or a $C_2$-$C_8$ alkenyl group; $R^9$ and $R^{13}$ each independently represent a hydrogen atom, a $C_1$-$C_8$ alkyl group, a chlorine atom, or a bromine atom; and $R^{10}$, $R^{11}$, and $R^{12}$ each independently represent a hydrogen atom, a $C_1$-$C_8$ alkyl group, or a $C_2$-$C_8$ alkenyl group, or $R^{10}$ and $R^{11}$ are taken together with the central aromatic ring to form a naphthyl group, or $R^{11}$ and $R^{12}$ are taken together with the central aromatic ring to form a naphthyl group. Specific alkenyl aromatic monomers include, for example, styrene, chlorostyrenes such as p-chlorostyrene, methylstyrenes such as alpha-methylstyrene and p-methylstyrene, and t-butylstyrenes such as 3-t-butylstyrene and 4-t-butylstyrene. In some embodiments, the alkenyl aromatic monomer is styrene.

The conjugated diene used to prepare the hydrogenated block copolymer can be a $C_4$-$C_{20}$ conjugated diene. Suitable conjugated dienes include, for example, 1,3-butadiene, 2-methyl-1,3-butadiene, 2-chloro-1,3-butadiene, 2,3-dimethyl-1, 3-butadiene, 1,3-pentadiene, 1,3-hexadiene, and the like, and combinations thereof In some embodiments, the conjugated diene is 1,3-butadiene, 2-methyl-1,3-butadiene, or a combination thereof. In some embodiments, the conjugated diene consists of 1,3-butadiene.

The hydrogenated block copolymer is a copolymer comprising (A) at least one block derived from an alkenyl aromatic compound and (B) at least one block derived from a conjugated diene, in which the aliphatic unsaturated group content in the block (B) is at least partially reduced by hydrogenation. In some embodiments, the aliphatic unsaturation in the (B) block is reduced by at least 50 percent, specifically at least 70 percent. The arrangement of blocks (A) and (B) includes a linear structure, a grafted structure, and a radial teleblock structure with or without a branched chain. Linear block copolymers include tapered linear structures and non-tapered linear structures. In some embodiments, the hydrogenated block copolymer has a tapered linear structure. In some embodiments, the hydrogenated block copolymer has a non-tapered linear structure. In some embodiments, the hydrogenated block copolymer comprises a (B) block that comprises random incorporation of alkenyl aromatic monomer. Linear block copolymer structures include diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of (A) and (B), wherein the molecular weight of each (A) block can be the same as or different from that of other (A) blocks, and the molecular weight of each (B) block can be the same as or different from that of other (B) blocks. In some embodiments, the hydrogenated block copolymer is a diblock copolymer, a triblock copolymer, or a combination thereof.

In some embodiments, the hydrogenated block copolymer excludes the residue of monomers other than the alkenyl aromatic compound and the conjugated diene. In some embodiments, the hydrogenated block copolymer consists of blocks derived from the alkenyl aromatic compound and the conjugated diene. It does not comprise grafts formed from these or any other monomers. It also consists of carbon and hydrogen atoms and therefore excludes heteroatoms. In some embodiments, the hydrogenated block copolymer includes the residue of one or more acid functionalizing agents, such as maleic anhydride. In some embodiments, the hydrogenated block copolymer comprises a polystyrene-poly(ethylene-butylene)-polystyrene triblock copolymer.

Methods for preparing hydrogenated block copolymers are known in the art and many hydrogenated block copolymers are commercially available. Illustrative commercially available hydrogenated block copolymers include the polystyrene-poly(ethylene-propylene) diblock copolymers available from Kraton Polymers as KRATON G1701 (having about 37 weight percent polystyrene) and G1702 (having about 28 weight percent polystyrene); the polystyrene-poly(ethylene-butylene)-polystyrene triblock copolymers available from Kraton Polymers as KRATON G1641 (having about 33 weight percent polystyrene), G1650 (having about 30 weight percent polystyrene), G1651 (having about 31-33 weight percent polystyrene), G1654 (having about 31 weight percent polystyrene), G1657 (having about 13 weight percent polystyrene), G1726 (having about 30 weight percent polystyrene), G4609 (having about 33 weight percent polystyrene), G4610 (having about 33 weight percent polystyrene), GRP-6598, RP-6924, MD-6932M, MD-6933, and MD-6939; the polystyrene-poly(ethylene-butylene-styrene)-polystyrene (S-EB/S—S) triblock copolymers available from Kraton Polymers as KRATON A1535 and A1536, the polystyrene-poly(ethylene-propylene)-polystyrene triblock copolymers available from Kraton Polymers as KRATON G1730; the maleic anhydride-grafted polystyrene-poly(ethylene-butylene)-polystyrene triblock copolymers available from Kraton Polymers as KRATON G1901, G1924, and MD-6684; the maleic anhydride-grafted polystyrene-poly(ethylene-butylene-styrene)-polystyrene triblock copolymer available from Kraton Polymers as KRATON MD-6670; the polystyrene-poly(ethylene-butylene)-polystyrene triblock copolymer comprising 42 weight percent polystyrene available from Asahi Kasei Elastomer as TUFTEC H1051; the polystyrene-poly(butadiene-butylene)-polystyrene triblock copolymers available from Asahi Kasei Elastomer as TUFTEC P1000; and the polystyrene-poly(ethylene-ethylene/propylene)-polystyrene triblock copolymers available from Kuraray as SEPTON 54044, 54055, 54077, and 54099. Mixtures of two of more hydrogenated block copolymers can be used.

The composition comprises the hydrogenated block copolymer in an amount of from about 3 to about 10 weight percent, specifically about 4 to about 9 weight percent, more specifically about 5 to about 8 weight percent, even more specifically about 6 to about 8 weight percent, based on the total weight of the composition.

The composition can, optionally, further comprise unhydrogenated block copolymers as an optional low concentration ingredient. Unhydrogenated block copolymers are similar to the hydrogenated block copolymers described above, except that the aliphatic unsaturation of the poly(conjugated diene) blocks have not been hydrogenated. Unhydrogenated block copolymers include, for example, polystyrene-polybutadiene diblock copolymers, polystyrene-polybutadiene-polystyrene triblock copolymers, polystyrene-polyisoprene diblock copolymers, polystyrene-polyisoprene-polystyrene triblock copolymers, and mixtures thereof.

The above-described block copolymers are known in the art, and are described, for example, in Gerard Riess, G. Hurtrez, and P. Bahadur, Block Copolymers, 2 Encyclopedia of Polymer Science and Engineering, 324 (H. F. Mark et al. eds., 1985), incorporated herein by reference. They may be either pure block copolymers or tapered (overlap) copolymers. Tapered styrene-rubber block copolymers have an area of the polymer between the styrene and rubber blocks in which both monomer units are present. The taper area is thought to exhibit a gradient, from a styrene-rich area closest to the styrene block to a rubber-rich area closest to the rubber block.

It will be understood that the phrase "comprising less than or equal to 2 weight percent of unhydrogenated block copolymers" encompasses compositions that exclude unhydrogenated block copolymers, as well as compositions comprising unhydrogenated block copolymers in an amount less than or equal to 2 weight percent. In some embodiments, the composition comprises less than or equal to 1 weight percent of unhydrogenated block copolymers. In some embodiments, the composition excludes unhydrogenated block copolymers due to negative effects on the long term exterior durability of articles molded from the composition.

The composition contains a polytetrafluoroethylene polymer, generally in an amount of about 0.02 to about 0.25 weight percent, specifically about 0.04 to about 0.2 weight percent, more specifically about 0.06 to about 0.15 weight percent. In some embodiments, the polytetrafluoroethylene is present in the composition in a fibrillar morphology that is maintained after compounding and molding. One source of fibrillar polytetrafluoroethylene is polytetrafluoroethylene grafted and/or coated with poly(styrene-acrylonitrile). The poly(styrene-acrylonitrile) graft and/or coating reduces aggregation of the polytetrafluoroethylene during high shear mixing.

The composition can, optionally, minimize or exclude components other than those taught above as required or optional. For example, in some embodiments, the composition comprises 0 to less than or equal to 5 weight percent polyamide. Within this range, the polyamide amount can be less than or equal to about 4 weight percent, specifically less than or equal to about 3 weight percent, more specifically less than or equal to about 2 weight percent polyamide, even more specifically less than or equal to about 1 weight percent polyamide. In some embodiments, the composition excludes polyamides.

Polyamides, also known as nylons, are characterized by the presence of a plurality of amide (—C(O)NH—) groups, and are described in U.S. Pat. No. 4,970,272 to Gallucci. Suitable polyamide resins include polyamide-6, polyamide-6,6, polyamide-4, polyamide-4,6, polyamide-12, polyamide-6, 10, polyamide 6,9, polyamide-6,12, amorphous polyamide resins, polyamide-6/6T and polyamide-6,6/6T with triamine contents below 0.5 weight percent, polyamide-9T, and combinations thereof In some embodiments, the polyamide resin comprises polyamide-6, polyamide-9T, or a mixture thereof. In some embodiments, the polyamide resin comprises polyamide-6,6. In some embodiments, the polyamide resin or combination of polyamide resins has a melting point ($T_m$) greater than or equal to 171° C. In some embodiments, the polyamide excludes so-called super tough polyamide, that is, a rubber-toughened polyamide. Polyamides may be obtained by a number of well known processes such as those described in U.S. Pat. Nos. 2,071,250, 2,071,251, 2,130,523, and 2,130, 948 to Carothers; U.S. Pat. Nos. 2,241,322 and 2,312,966 to Hanford; and U.S. Pat. No. 2,512,606 to Bolton et al. Polyamide resins are commercially available from a variety of sources.

In some embodiments, the composition comprises one or more additives selected from the group consisting of compatibilizers, stabilizers, antioxidants, polyamide flow promoters, poly(arylene ether) flow promoters, drip retardants, nucleating agents, UV blockers, dyes, and pigments. The amount of each additive will vary according to the additive type and the intended use of the composition, but each additive is typically used in an amount of less than or equal to 5 weight percent, specifically less than or equal to 4 weight percent, more specifically less than or equal to 3 weight percent, still more specifically less than or equal to 2 weight percent, yet more specifically less than or equal to 1 weight percent, based on the total weight of the composition. In some embodiments, the total amount of additives is less than or equal to 15 weight percent, specifically less than or equal to 12 weight percent, more specifically less than or equal to 8 weight percent, still more specifically less than or equal to 6 weight percent, even more specifically less than or equal to 4 weight percent, yet more specifically less than or equal to 2 weight percent.

In some embodiments, the composition comprises a polyolefin. Polyolefins include polyethylenes (including high density polyethylene (HDPE), low density polyethylene (LDPE), medium density polyethylene (MDPE), and linear low density polyethylene (LLDPE)), polypropylenes (including atactic, syndiotactic, and isotactic polypropylenes), and polyisobutylenes. Polyolefins and methods for their preparation are known in the art and are described for example in U.S. Pat. No. 2,933,480 to Gresham et al., U.S. Pat. No. 3,093,621 to Gladding, U.S. Pat. No. 3,211,709 to Adamek et al., U.S. Pat. No. 3,646,168 to Barrett, U.S. Pat. No. 3,790,519 to Wahlborg, U.S. Pat. No. 3,884,993 to Gros, U.S. Pat. No. 3,894,999 to Boozer et al., and U.S. Pat. No. 4,059,654 to von Bodungen. In some embodiments the polyolefin consists essentially of a polyolefin homopolymer, specifically a crystalline polyolefin homopolymer. The density of polyethylene (HDPE, LDPE, MDPE, LLDPE) can be 0.90 gram/cm$^3$ to 0.98 gram/cm$^3$. Polyolefins include ethylene/alpha-olefin copolymers, such as copolymers of ethylene and 1-butene, copolymers of ethylene and 1-hexene, and copolymers of ethylene and 1-octene. Additionally, copolymers of olefins can also be used, such as copolymers of polypropylene with rubber and polyethylene with rubber. Copolymers of polypropylene and rubber are sometimes referred to as impact modified polypropylene. Such copolymers are typically heterophasic and have sufficiently long sections of each component to have both amorphous and crystalline phases. In some embodiments the polyolefin comprises a polyolefin block copolymer comprising an end group consisting essentially of a polyolefin homopolymer of $C_2$ to $C_3$ olefins and a middle block comprising a copolymer of $C_2$ to $C_{12}$ olefins. Additionally the polyolefin can comprise a combination of homopolymer and copolymer, a combination of homopolymers having different melt temperatures, and/or a combination of homopolymers having a different melt flow rate. In some embodiments, the polyolefin comprises a high density polyethylene (HDPE). The high density polyethylene can have a density of 0.941 to 0.965 grams per milliliter. In some embodiments, the polyolefin has a melt flow rate (MFR) of about 0.3 to about 10 grams per ten minutes (g/10 min). Specifically, the melt flow rate can be about 0.3 to about 5 grams per ten minutes. Melt flow rate can be determined according to ASTM D1238-10 using either powdered or pelletized polyolefin, a load of 2.16 kilograms and a temperature suitable for the polyolefin (190° C. for ethylene-based polyolefins and 230° C. for propylene-based polyolefins). In some embodiments, the polyolefin comprises homopolyethylene or a polyethylene copolymer. Additionally the polyethylene can comprise a combination of homopolymer and copolymer, a combination of homopolymers having different melting temperatures, and/or a combination of homopolymers having different melt flow rates. The polyethylene can have a density of 0.911 to 0.98 grams per cubic centimeter. In some embodiments, the composition comprises about 0.5 to about 1.5 weight percent of a linear low density polyethylene. In some embodiments, the composition comprises less than or equal to 2 weight percent polyolefin.

In some embodiments, the composition comprises less than or equal to 2 weight percent of carboxylic acids and carboxylic acid anhydrides. In some embodiments, the composition comprises less than or equal to 1 weight percent of carboxylic acids and carboxylic acid anhydrides. In other embodiments, the composition comprises less than or equal to 0.5 weight percent of carboxylic acids and carboxylic acid anhydrides. In some embodiments, the composition excludes carboxylic acids and carboxylic acid anhydrides.

In this context, the terms "carboxylic acids" and "carboxylic acid anhydrides" refer to molecules, rather than to functional groups. Carboxylic acids include, for example, adipic acid, glutaric acid, malonic acid, succinic acid, phthalic acid, maleic acid, citraconic acid, itaconic acid, citric acid, hydrates of the foregoing acids, and mixtures thereof Carboxylic acid anhydrides include, for example, adipic anhydride, glutaric anhydride, malonic anhydride, succinic anhydride, phthalic anhydride, maleic anhydride, citraconic anhydride, itaconic anhydride, and mixtures thereof It will be understood that "comprising less than or equal to 2 weight percent of carboxylic acids and carboxylic acid anhydrides" encompasses compositions that exclude carboxylic acids and carboxylic acid anhydrides, as well as compositions comprising carboxylic acids and/or carboxylic acid anhydrides in a total amount of less than or equal to 2 weight percent.

In some embodiments the composition comprises less than or equal to 1 weight percent of reinforcing fillers. Reinforcing fillers include, for example, glass fibers, carbon fibers, metal fibers, metal flakes, and mixtures thereof In some embodiments, the composition excludes reinforcing fillers.

In some embodiments the composition comprises less than or equal to 1 weight percent or electrically conductive fillers. Electrically conductive fillers include, for example, carbon nanotubes, carbon fibers, electrically conductive carbon black, metal fibers, metal flakes, and mixtures thereof In some embodiments, the composition excludes electrically conductive fillers.

The invention includes articles molded from the composition of the invention. The composition is particularly adapted for molding photovoltaic junction boxes and connectors. These articles can be molded according to known processes, such as injection molding, blow molding, etc. Specific configurations for photovoltaic junction boxes and connectors are described in, for example, U.S. Pat. No. 7,291,036 B1 to Daily et al.; U.S. Pat. No. 7,824,189 to Lauermann et al.; U.S. Patent Application Publication No. US 2010/0218797 A1 of Coyle et al.; and U.S. Patent Application Publication No. US 2010/0294903 A1 of Shmukler et al.

The invention includes at least the following embodiments.

Embodiment 1: A composition comprising: about 65 to about 75 weight percent of a poly(arylene ether); about 3 to about 12 weight percent of a styrenic polymer selected from the group consisting of homopolystyrenes, rubber-modified impact polystyrenes, and mixtures thereof; about 10 to about 20 weight percent of a flame retardant consisting of an organophosphate ester and, optionally, an auxiliary flame retardant selected from the group consisting of nitrogen-containing flame retardants, metal hydroxides, and mixtures thereof; about 3 to about 10 weight percent of a hydrogenated block copolymer of an alkenyl aromatic compound and a conjugated diene, wherein the hydrogenated block copolymer comprises about 10 to about 45 weight percent poly(alkenyl aromatic) content, based on the weight of the hydrogenated block copolymer; and about 0.02 to about 0.25 weight percent of a polytetrafluoroethylene; wherein the composition comprises less than or equal to 5 weight percent polyamide; and wherein all weight percents are based on the total weight of the composition unless a different weight basis is specified.

Embodiment 2: The composition of embodiment 1, wherein the polytetrafluoroethylene comprises a polytetrafluoroethylene grafted and/or coated with poly(styrene-acrylonitrile).

Embodiment 3: The composition of embodiments 1 or 2, wherein the flame retardant consists of the organophosphate ester.

Embodiment 4: The composition of any of embodiments 1 to 3, wherein the hydrogenated block copolymer comprises a polystyrene-poly(ethylene-butylene)-polystyrene triblock copolymer having a weight average molecular weight of at least 200,000 atomic mass units.

Embodiment 5: The composition of any of embodiments 1 to 4, wherein the styrenic polymer consists of homopolystyrene.

Embodiment 6: The composition of any of embodiments 1 to 5, further comprising about 0.5 to about 1.5 weight percent of a linear low density polyethylene.

Embodiment 7: The composition of any of embodiments 1 to 6, further comprising less than or equal to 2 weight percent polyolefin.

Embodiment 8: The composition of any of embodiments 1 to 7, further comprising less than or equal to 2 weight percent of unhydrogenated block copolymers.

Embodiment 9: The composition of any of embodiments 1 to 8, further comprising less than or equal to 2 weight percent of carboxylic acids and carboxylic acid anhydrides.

Embodiment 10: The composition of any of embodiments 1 to 9, further comprising less than or equal to 1 weight percent of reinforcing fillers.

Embodiment 11: The composition of any of embodiments 1 to 10, further comprising less than or equal to 1 weight percent of electrically conductive fillers.

Embodiment 12: The composition of embodiment 1, wherein the polytetrafluoroethylene comprises a polytetrafluoroethylene grafted and/or coated with poly(styrene-acrylonitrile); wherein the flame retardant consists of the organophosphate ester; wherein the hydrogenated block copolymer comprises a polystyrene-poly(ethylene-butylene)-polystyrene triblock copolymer having a weight average molecular weight of at least 200,000 atomic mass units; wherein the styrenic polymer consists of homopolystyrene; wherein the composition comprises less than or equal to 2 weight percent polyolefin; wherein the composition comprises less than or equal to 2 weight percent of unhydrogenated block copolymers; wherein the composition comprises less than or equal to 2 weight percent of carboxylic acids and carboxylic acid anhydrides; wherein the composition comprises less than or equal to 1 weight percent of reinforcing fillers; and wherein the composition comprises less than or equal to 1 weight percent of electrically conductive fillers.

Embodiment 13: An injection molded article, comprising a composition comprising: about 65 to about 75 weight percent of a poly(arylene ether); about 3 to about 12 weight percent of a styrenic polymer selected from the group consisting of homopolystyrenes, rubber-modified impact polystyrenes, and mixtures thereof; about 10 to about 20 weight percent of a flame retardant consisting of an organophosphate ester and, optionally, an auxiliary flame retardant selected from the group consisting of nitrogen-containing flame retardants, metal hydroxides, and mixtures thereof; about 3 to about 10 weight percent of a hydrogenated block copolymer of an alkenyl aromatic compound and a conjugated diene, wherein the hydrogenated block copolymer comprises about 10 to about 45 weight percent poly(alkenyl aromatic) content, based on the weight of the hydrogenated block copolymer; and about 0.02 to about 0.2 weight percent of a polytetrafluoroethylene; wherein the composition comprises less than or equal to 5 weight percent polyamide; and wherein all weight percents are based on the total weight of the composition unless a different weight basis is specified.

Embodiment 14: The injection molded article of embodiment 13, wherein the polytetrafluoroethylene comprises a polytetrafluoroethylene grafted and/or coated with poly(styrene-acrylonitrile).

Embodiment 15: The injection molded article of embodiments 13 or 14, wherein the flame retardant consists of the organophosphate ester.

Embodiment 16: The injection molded article of any of embodiments 12 to 15, wherein the hydrogenated block copolymer comprises a polystyrene-poly(ethylene-butylene)-polystyrene triblock copolymer having a weight average molecular weight of at least 200,000 atomic mass units.

Embodiment 17: The injection molded article of any of embodiments 13 to 16, wherein the styrenic polymer consists of homopolystyrene.

Embodiment 18: The injection molded article of any of embodiments 13 to 17, wherein the composition further comprises about 0.5 to about 1.5 weight percent of a linear low density polyethylene.

Embodiment 19: The injection molded article of any of embodiments 13 to 18, wherein the composition further comprises less than or equal to 2 weight percent polyolefin.

Embodiment 20: The injection molded article of any of embodiments 13 to 19, wherein the composition further comprises less than or equal to 2 weight percent of unhydrogenated block copolymers.

Embodiment 21: The injection molded article of any of embodiments 13 to 20, wherein the composition further comprises less than or equal to 2 weight percent of carboxylic acids and carboxylic acid anhydrides.

Embodiment 22: The injection molded article of any of embodiments 13 to 21, wherein the composition further comprises less than or equal to 1 weight percent of reinforcing fillers.

Embodiment 23: The injection molded article of any of embodiments 13 to 22, wherein the composition further comprises less than or equal to 1 weight percent of electrically conductive fillers.

Embodiment 24: The injection molded article of embodiment 13, wherein the polytetrafluoroethylene comprises a polytetrafluoroethylene grafted and/or coated with poly(styrene-acrylonitrile); wherein the flame retardant consists of the organophosphate ester; wherein the hydrogenated block copolymer comprises a polystyrene-poly(ethylene-butylene)-polystyrene triblock copolymer having a weight average molecular weight of at least 200,000 atomic mass units; wherein the styrenic polymer consists of homopolystyrene; wherein the composition comprises less than or equal to 2 weight percent polyolefin; wherein the composition comprises less than or equal to 2 weight percent of unhydrogenated block copolymers; wherein the composition comprises less than or equal to 2 weight percent of carboxylic acids and carboxylic acid anhydrides; wherein the composition comprises less than or equal to 1 weight percent of reinforcing fillers; and wherein the composition comprises less than or equal to 1 weight percent of electrically conductive fillers.

Embodiment 25. The injection molded article of any of embodiments 13 to 24, wherein the injection molded article is a photovoltaic junction box or a photovoltaic junction connector.

The invention is further illustrated by the following non-limiting examples.

Example 1 and Comparative Examples 1-4

These examples illustrate the unexpected benefit of combining the specified formulation ingredients to produce a molding composition that exhibits a surprisingly advantageous set of properties and makes the molding composition especially suited for use in molding photovoltaic junction boxes and connectors.

Components used to prepare the compositions are summarized in Table 1.

TABLE 1

| Component | Description |
|---|---|
| PPE 0.46 | Poly(2,6-dimethyl-1,4-phenylene ether), CAS Reg. No. 25134-01-4, having an intrinsic viscosity of 0.46 deciliter per gram measured in chloroform at 25° C.; obtained as PPO 646 from SABIC Innovative Plastics. |
| PPE 0.40 | Poly(2,6-dimethyl-1,4-phenylene ether), CAS Reg. No. 25134-01-4, having an intrinsic viscosity of 0.40 deciliter per gram measured in chloroform at 25° C.; obtained as PPO 640 from SABIC Innovative Plastics. |
| PS | Atactic polystyrene, CAS Reg. No. 9003-53-6, having a melt flow index of 5.5 grams per 10 minutes and a mineral oil content of less than 2 weight percent; obtained as Verex 1600 from Nova Chemicals. |
| HIPS | High-impact polystyrene (rubber-modified polystyrene), CAS Reg. No. 9003-55-8, having a volume average particle diameter of 2.4 micrometers, a rubber content of 10 weight percent, a mineral oil content of 1.5 weight percent, and a swell index of 17; obtained as HIPS3190 from SABIC Innovative Plastics. |
| SEBS | Polystyrene-poly(ethylene-butylene)-polystyrene triblock copolymer, CAS Reg. No. 66070-58-4, having a polystyrene content of about 30-33 weight percent and a weight average molecular weight of about 240,000-301,000 atomic mass units; obtained as KRATON G1651 from Kraton Polymers Ltd. |
| LLDPE | Linear low density polyethylene, CAS Reg. No. 25087-34-7, having a density of 0.925 grams per cubic centimeter and a melt volume-flow rate of about 20 cubic centimeters per 10 minutes at 190° C. and 2.16 kilogram load; obtained as ESCORENE LL5100.09 from ExxonMobil. |
| TBPP | Tris(2,4-di-tert-butylphenyl) phosphite, CAS Reg. No. 31570-04-4; obtained as IRGAFOS 168 from BASF Corp. |
| MgO | Magnesium oxide, CAS Reg. No. 1309-48-4; obtained as KYOWAMAG 150 from Kyowa Chemical Co. Ltd. |
| ZnO | Zinc oxide, CAS Reg. No. 1314-13-2; obtained as Zinkweiss Harzsiegel CF from Norzinco GmbH. |
| ZnS | Zinc sulfide, CAS Reg. No. 1314-98-3; obtained as Sachtolith HD-S from Sachtleben Chemie GmbH. |
| TNPP/DPDP | 5 parts tris(nonylphenyl) phosphite (TNPP), CAS Reg. No. 26523-78-4, blended with 4 parts diphenyl isodecyl phosphite (DPDP), CAS Reg. No. 26544-23-0; obtained as GEP1 from Chemtura. |
| TSAN | Poly(styrene-acrylonitrile)-encapsulated polytetrafluoroethylene, containing 50 weight percent polytetrafluoroethylene; obtained as F449 Encapsulated PTFE from SABIC Innovative Plastics. |

TABLE 1-continued

| Component | Description |
|---|---|
| BPADP | Bisphenol A bis(diphenyl phosphate), CAS Reg. No. 181028-79-5; obtained as CR-741 from Daihachi Chemical. |
| RDP | Resorcinol bis(diphenyl phosphate), CAS Reg. No. 57583-54-7; obtained as CR-733S from Daihachi Chemical. |

Compositions of Example 1 and Comparative Examples 1-4 are summarized in Table 2, where component amounts are in parts by weight. These five poly(arylene ether) compositions were prepared from individual components as follows. Components were compounded in a 30 millimeter internal diameter twin-screw extruder operating at 300 rotations per minute with barrel temperatures of 240 to 290° C. from feedthroat to die. All components except for the polyethylene and flame retardant were added at the feedthroat of the extruder. Polyethylene was added downstream of the feedthroat, and the aryl phosphate flame retardant (BPADP or RDP) was added further downstream via a liquid injector in the second half of the extruder. The extrudate was pelletized, and the pellets dried at 80° C. for four hours prior to subsequent use for injection molding.

The poly(arylene ether) compositions were injection molded into articles for physical testing. Injection molding was conducted on a Van Dorn 120T injection molding machine using barrel temperatures of 530° F. (266.7° C.) and a mold temperature of 190° F. (87.7° C.). Property values are reported in Table 2. Heat deflection temperature (HDT) values, expressed in units of degrees centigrade, were measured at 264 pounds per square inch (1.82 megapascals) on 0.25 inch (6.35 millimeter) thick bars according to ASTM D648-07 and reported in the Table 2 row labeled "HDT@¼" 1.82 MPa (° C.)". A heat deflection temperature value greater than 115° C. is desirable for photovoltaic junction box and connector applications. Notched Izod impact strength values, expressed in units of Joules per meter, were measured at 23° C. using a 2 foot-pound-force (2.71 Joule) hammer on 3.2 millimeter bars according to ASTM D256-10 and reported in the Table 2 row labeled "Notched Izod Impact (J/m)". A notched Izod impact strength value of greater than 200 joules per meter is desirable for photovoltaic junction box and connector applications. Melt volume rate values, expressed in units of cubic centimeters per 10 minutes, were measured at 300° C. using a 5 kilogram load according to ASTM D1238-10 and reported in the Table 2 row labeled "MVR, 300° C., 5 kg (cc/10 min)". A melt volume-flow rate value of greater than 18 cubic centimeters per 10 minutes is desirable for photovoltaic junction box and connector applications. Minimum V-0 thickness values, expressed in millimeters, were measured according to the 20 Millimeter Vertical Burn test of UL94—Standard for Tests for Flammability of Plastic Materials for Parts in Devices and Appliances, as specified in UL 1703—Flat Plate Photovoltaic Modules And Panels (Revised April 2008) and reported in the Table 2 row labeled "Min. V-0 Thickness (mm)". A minimum V-0 thickness value of less than 1.5 millimeters is desirable for photovoltaic junction box and connector applications. Minimum 5A/5B thickness values, expressed in millimeters, were measured according to the 125 Millimeter Vertical Burn test of UL94—Standard for Tests for Flammability of Plastic Materials for Parts in Devices and Appliances, as specified in UL 1703—Flat Plate Photovoltaic Modules And Panels (Revised April 2008) and reported in the Table 2 row labeled "MM. 5VA/5VB Thickness (mm)" A minimum 5VA/5VB thickness value of less than or equal to 3 millimeters is desirable for photovoltaic junction box and connector applications.

Example 1 exceeded all performance targets, which illustrates the advantageous combination of properties achieved according to the invention. The superior results achieved in the main components loading range, with such small amount of PTFE, is unexpected.

Comparative Examples 1-4 each exhibited at least one significant performance deficiency.

Comparative Example 1 did not achieve a 5VA/5VB minimum thickness of 3.0 millimeters or less. Indeed the 3.2 millimeter test bar did not pass the test and the result is therefore reported in Table 2 as >3.2. In contrast, the Example 1 composition achieved 5VA/5VB performance at a thickness of 2.5 millimeters.

Comparative Example 2 failed to exhibit a melt volume rate value of greater than 18 cubic centimeters per 10 minutes. Its melt volume rate of 10 cubic centimeters per 10 minutes indicates that this composition will exhibit limited moldability in particular for part thickness less than 3 mm. In contrast, the Example 1 composition exhibited a melt volume-flow rate of 20 cubic centimeters per 10 minutes.

Comparative Example 3 failed to exhibit a notched Izod impact strength value of greater than 200 Joules per meter, and it failed to exhibit a minimum V-0 thickness of less than 1.5 millimeters. So, Comparative Example 3 is deficient in both impact strength and flame retardancy. In contrast, the Example 1 composition exhibited a notched Izod impact strength of 250 joules per meter and a minimum V-0 thickness of 1.0 millimeter.

Comparative Example 4 failed to exhibit a notched Izod impact strength value of greater than 200 Joules per meter. Its notched Izod impact strength value of 100 Joules per meter indicates that photovoltaic junction boxes molded this composition will exhibit inadequate ruggedness. In contrast, the Example 1 composition exhibited a notched Izod impact strength of 250 Joules/meter. Comparative Example 4 also incorporates an unsaturated impact modifier, which is more susceptible to crosslinking under extended exposure conditions of elevated temperatures and/or ultraviolet light in air. Therefore, the ductility of the Comparative Example 4 composition is expected to degrade over time with environmental exposure.

TABLE 2

| | Ex. 1 | C. Ex. 1 | C. Ex. 2 | C. Ex. 3 | C. Ex. 4 |
|---|---|---|---|---|---|
| | COMPOSITIONS | | | | |
| PPE 0.46 | 70.00 | 68.05 | 81.20 | 0.00 | 66.95 |
| PPE 0.40 | 0.00 | 0.00 | 0.00 | 76.60 | 0.00 |
| PS | 7.50 | 10.25 | 2.00 | 5.00 | 0.00 |
| HIPS | 0.00 | 0.00 | 0.00 | 0.00 | 18.65 |
| SEBS | 5.70 | 5.60 | 6.20 | 6.30 | 0.00 |
| LLDPE | 1.30 | 1.30 | 0.00 | 0.00 | 1.30 |
| TSAN | 0.27 | 0.00 | 0.00 | 0.00 | 0.00 |
| TBPP | 0.09 | 0.09 | 0.00 | 0.00 | 0.09 |
| TNPP/DPDP | 0.00 | 0.00 | 0.50 | 0.50 | 0.00 |
| MgO | 0.12 | 0.13 | 0.00 | 0.00 | 0.13 |

TABLE 2-continued

|  | Ex. 1 | C. Ex. 1 | C. Ex. 2 | C. Ex. 3 | C. Ex. 4 |
|---|---|---|---|---|---|
| ZnO | 0.00 | 0.00 | 0.15 | 0.15 | 0.00 |
| ZnS | 0.12 | 0.13 | 0.15 | 0.15 | 0.13 |
| BPADP | 14.90 | 14.45 | 0.00 | 0.00 | 12.75 |
| RDP | 0.00 | 0.00 | 9.80 | 11.30 | 0.00 |
| total | 100.00 | 100.00 | 100.00 | 100.00 | 100.00 |
| PROPERTIES | | | | | |
| HDT @ ¼" 1.82 MPa (° C.) | 122 | 119 | 141 | 130 | 121 |
| Notched Izod Impact (J/m) | 250 | 250 | 300 | 180 | 100 |
| MVR, 300° C., 5 kg (cc/10 min) | 20 | 30 | 10 | 19 | 28 |
| Min. V-0 Thickness (mm) | 1.0 | 1.0 | 1.0 | 1.5 | 0.75 |
| Min. 5VA/5VB Thickness (mm) | 2.5 | >3.2 | 2.0 | 2.0 | 2.5 |

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A composition comprising:
about 65 to about 75 weight percent of a poly(arylene ether);
about 3 to about 12 weight percent of a styrenic polymer selected from the group consisting of homopolystyrenes, rubber-modified impact polystyrenes, and mixtures thereof;
about 10 to about 20 weight percent of a flame retardant consisting of an organophosphate ester and, optionally, an auxiliary flame retardant selected from the group consisting of nitrogen-containing flame retardants, metal hydroxides, and mixtures thereof;
about 3 to about 10 weight percent of a hydrogenated block copolymer of an alkenyl aromatic compound and a conjugated diene, wherein the hydrogenated block copolymer comprises about 10 to about 45 weight percent poly(alkenyl aromatic) content, based on the weight of the hydrogenated block copolymer, and wherein the hydrogenated block copolymer comprises a polystyrene-poly(ethylene-butylene)-polystyrene triblock copolymer having a weight average molecular weight of at least 200,000 atomic mass units; and
about 0.02 to about 0.25 weight percent of a polytetrafluoroethylene;
wherein the composition comprises less than or equal to 5 weight percent polyamide;
wherein all weight percents are based on the total weight of the composition; and
wherein the composition exhibits a notched Izod impact strength of at least 200 joules/meter measured at 23° C. according to ASTM D256-10 using a 2 foot-pound-force (2.71 joule) hammer on 3.2 millimeter bars.

2. The composition of claim 1, wherein the polytetrafluoroethylene comprises a polytetrafluoroethylene grafted and/or coated with poly(styrene-acrylonitrile).

3. The composition of claim 1, wherein the flame retardant consists of the organophosphate ester.

4. The composition of claim 1, wherein the styrenic polymer consists of homopolystyrene.

5. The composition of claim 1, further comprising about 0.5 to about 1.5 weight percent of a linear low density polyethylene.

6. The composition of claim 1, comprising less than or equal to 2 weight percent polyolefin.

7. The composition of claim 1, comprising less than or equal to 2 weight percent of unhydrogenated block copolymers.

8. The composition of claim 1, comprising less than or equal to 2 weight percent of carboxylic acids and carboxylic acid anhydrides.

9. The composition of claim 1, comprising less than or equal to 1 weight percent of reinforcing fillers.

10. The composition of claim 1, comprising less than or equal to 1 weight percent of electrically conductive fillers.

11. The composition of claim 1,
wherein the polytetrafluoroethylene comprises a polytetrafluoroethylene grafted and/or coated with poly(styrene-acrylonitrile);
wherein the flame retardant consists of the organophosphate ester;
wherein the styrenic polymer consists of homopolystyrene;
wherein the composition comprises less than or equal to 2 weight percent polyolefin;
wherein the composition comprises less than or equal to 2 weight percent of unhydrogenated block copolymers;
wherein the composition comprises less than or equal to 2 weight percent of carboxylic acids and carboxylic acid anhydrides;
wherein the composition comprises less than or equal to 1 weight percent of reinforcing fillers; and
wherein the composition comprises less than or equal to 1 weight percent of electrically conductive fillers.

12. The composition of claim 1, further comprising an additive consisting of one or more additives selected from the group consisting of compatibilizers, stabilizers, antioxidants, polyamide flow promoters, poly(arylene ether) flow promoters, drip retardants, nucleating agents, UV blockers, dyes, and pigments.

13. An injection molded article, comprising a composition comprising:

about 65 to about 75 weight percent of a poly(arylene ether);

about 3 to about 12 weight percent of a styrenic polymer selected from the group consisting of homopolystyrenes, rubber-modified impact polystyrenes, and mixtures thereof;

about 10 to about 20 weight percent of a flame retardant consisting of an organophosphate ester and, optionally, an auxiliary flame retardant selected from the group consisting of nitrogen-containing flame retardants, metal hydroxides, and mixtures thereof;

about 3 to about 10 weight percent of a hydrogenated block copolymer of an alkenyl aromatic compound and a conjugated diene, wherein the hydrogenated block copolymer comprises about 10 to about 45 weight percent poly(alkenyl aromatic) content, based on the weight of the hydrogenated block copolymer, and wherein the hydrogenated block copolymer comprises a polystyrene-poly(ethylene-butylene)-polystyrene triblock copolymer having a weight average molecular weight of at least 200,000 atomic mass units; and about 0.02 to about 0.2 weight percent of a polytetrafluoroethylene;

wherein the composition comprises less than or equal to 5 weight percent polyamide;

wherein all weight percents are based on the total weight of the composition unless a different weight basis is specified; and wherein the composition exhibits a notched Izod impact strength of at least 200 joules/meter measured at 23° C. according to ASTM D256-10 using a 2 foot-pound-force (2.71 joule) hammer on 3.2 millimeter bars.

14. The injection molded article of claim 13, wherein the polytetrafluoroethylene comprises a polytetrafluoroethylene grafted and/or coated with poly(styrene-acrylonitrile).

15. The injection molded article of claim 13, wherein the flame retardant consists of the organophosphate ester.

16. The injection molded article of claim 13, wherein the styrenic polymer consists of homopolystyrene.

17. The injection molded article of claim 13, wherein the composition further comprises about 0.5 to about 1.5 weight percent of a linear low density polyethylene.

18. The injection molded article of claim 13, wherein the composition further comprises less than or equal to 2 weight percent polyolefin.

19. The injection molded article of claim 13, wherein the composition further comprises less than or equal to 2 weight percent of unhydrogenated block copolymers.

20. The injection molded article of claim 13, wherein the composition further comprises less than or equal to 2 weight percent of carboxylic acids and carboxylic acid anhydrides.

21. The injection molded article of claim 13, wherein the composition further comprises less than or equal to 1 weight percent of reinforcing fillers.

22. The injection molded article of claim 13, wherein the composition further comprises less than or equal to 1 weight percent of electrically conductive fillers.

23. The injection molded article of claim 13,
wherein the polytetrafluoroethylene comprises a polytetrafluoroethylene grafted and/or coated with poly(styrene-acrylonitrile);
wherein the flame retardant consists of the organophosphate ester;
wherein the styrenic polymer consists of homopolystyrene;
wherein the composition comprises less than or equal to 2 weight percent polyolefin;
wherein the composition comprises less than or equal to 2 weight percent of unhydrogenated block copolymers;
wherein the composition comprises less than or equal to 2 weight percent of carboxylic acids and carboxylic acid anhydrides;
wherein the composition comprises less than or equal to 1 weight percent of reinforcing fillers; and
wherein the composition comprises less than or equal to 1 weight percent of electrically conductive fillers.

24. The injection molded article of claim 13, wherein the injection molded article is a photovoltaic junction box or a photovoltaic junction connector.

25. The injection molded article of claim 13, wherein the composition further comprises an additive consisting of one or more additives selected from the group consisting of compatibilizers, stabilizers, antioxidants, polyamide flow promoters, poly(arylene ether) flow promoters, drip retardants, nucleating agents, UV blockers, dyes, and pigments.

* * * * *